United States Patent
Sasabe et al.

(10) Patent No.: US 8,513,364 B2
(45) Date of Patent: *Aug. 20, 2013

(54) PRODUCTION METHOD OF WATER-ABSORBENT RESIN

(75) Inventors: Masazumi Sasabe, Kakogawa (JP); Sumio Okuda, Ibo-gun (JP); Yorimichi Dairoku, Himeji (JP); Shuji Kanzaki, Himeji (JP); Yoshihiro Kita, Himeji (JP); Motohiro Imura, Akashi (JP)

(73) Assignee: Nippon Shokubai Co., Ltd., Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 11/336,312

(22) Filed: Jan. 20, 2006

(65) Prior Publication Data

US 2006/0167198 A1    Jul. 27, 2006

(30) Foreign Application Priority Data

Jan. 21, 2005  (JP) .................... 2005-014183

(51) Int. Cl.
*C08F 20/06* (2006.01)

(52) U.S. Cl.
USPC ............ 526/62; 526/317.1; 526/318.43; 526/322; 528/480; 528/481

(58) Field of Classification Search
USPC ............................. 528/480; 526/62
See application file for complete search history.

(56) References Cited

U.S. PATENT DOCUMENTS

| | | | |
|---|---|---|---|
| 4,029,868 A * | 6/1977 | Carlson | 526/247 |
| 4,163,742 A * | 8/1979 | Mansure | 523/220 |
| 4,294,676 A * | 10/1981 | Boutin et al. | 522/173 |
| 4,552,938 A | 11/1985 | Mikita et al. | |
| 4,612,336 A | 9/1986 | Yada et al. | |
| 4,625,001 A | 11/1986 | Tsubakimoto et al. | |
| 4,857,610 A | 8/1989 | Chmelir et al. | |
| 4,893,999 A * | 1/1990 | Chmelir et al. | 425/174.4 |
| 4,985,518 A | 1/1991 | Alexander et al. | |
| 5,004,761 A | 4/1991 | Yada et al. | |
| 5,124,416 A | 6/1992 | Haruna et al. | |
| 5,380,808 A | 1/1995 | Sumiya et al. | |

(Continued)

FOREIGN PATENT DOCUMENTS

| | | |
|---|---|---|
| CN | 1296981 A | 5/2001 |
| EP | 0 885917 A2 | 12/1998 |

(Continued)

OTHER PUBLICATIONS

Machine translation of JP 07-311505 A, retrieved Nov. 8, 2011.*

(Continued)

*Primary Examiner* — Nicole M Buie-Hatcher
(74) *Attorney, Agent, or Firm* — Edwards Wildman Palmer LLP; George W. Neuner (57) ABSTRACT

A production method of a water-absorbent resin includes the steps of: obtaining a hydrogel by supplying monomer liquid to a reaction device so that the monomer liquid is polymerized; and detaching the hydrogel from the reaction device, wherein the reaction device's surface in contact with the monomer liquid at a position where polymerization occurs is made of a fluororesin having a melt viscosity of less than $1 \times 10^8$ poise at 380° C. On this account, it is possible to obtain a water-absorbent resin having less amounts of an extractable content with high productivity and it is possible to carry out continuous production for an extended period of time.

20 Claims, 1 Drawing Sheet

(56) References Cited

U.S. PATENT DOCUMENTS

| | | |
|---|---|---|
| 6,140,395 A | 10/2000 | Hatsuda et al. |
| 6,174,978 B1 | 1/2001 | Hatsuda et al. |
| 6,241,928 B1 | 6/2001 | Hatsuda et al. |
| 6,362,243 B1 | 3/2002 | Sasabe et al. |
| 6,667,372 B1 | 12/2003 | Miyake et al. |
| 7,622,535 B2 * | 11/2009 | Dairoku et al. .............. 526/65 |
| 2002/0040095 A1 | 4/2002 | Dairoku et al. |
| 2003/0020199 A1 * | 1/2003 | Kajikawa et al. ............ 264/140 |
| 2004/0092688 A1 | 5/2004 | Dairoku et al. |
| 2004/0183235 A1 | 9/2004 | Dairoku et al. |

FOREIGN PATENT DOCUMENTS

| | | |
|---|---|---|
| GB | 1 310 729 A | 3/1973 |
| GB | 2 146 343 A | 4/1985 |
| JP | 58-15481 | 3/1983 |
| JP | 60-055002 | 3/1985 |
| JP | 61-155405 | 7/1986 |
| JP | 62-156102 | 7/1987 |
| JP | 6-15568 | 3/1994 |
| JP | 07311505 A * | 11/1995 |
| JP | 11-228604 | 8/1999 |
| JP | 11-302306 | 11/1999 |
| JP | 2000-034305 | 2/2000 |
| JP | 2001-131218 | 5/2001 |
| JP | 2002-212204 | 7/2002 |
| JP | 2003-135905 | 5/2003 |
| JP | 1 418 000 A2 | 5/2004 |
| JP | 2004-155963 | 6/2004 |
| JP | 2004-352849 | 12/2004 |
| JP | 2004 352849 A | 12/2004 |
| JP | 2005036100 | 2/2005 |
| WO | WO 94/05712 A1 | 3/1994 |
| WO | WO 01/18065 | 3/2001 |

OTHER PUBLICATIONS

Brown et al., Chemistry: The Central Science, 1997, Prentice-Hall, Inc., Seventh edition, p. 665.*

Japanese Office Action (translated into English) followed by nontranslated pages.

European Search Report for EP Application No. 06000939.6, Sep. 6, 2011.

Dairoku Yorimichi; Method for Producing Water-Absorbing Resin; JP200503100 Feb. 10, 2005, machine translation.

* cited by examiner

PRODUCTION METHOD OF WATER-ABSORBENT RESIN

This Nonprovisional application claims priority under 35 U.S.C. § 119(a) on Patent Application No. 14183/2005 filed in Japan on Jan. 21, 2005, the entire contents of which are hereby incorporated by reference.

FIELD OF THE INVENTION

The present invention relates to a production method of a water-absorbent resin whose productivity is high, and is favorably applicable in continuously producing the water-absorbent resin by carrying out aqueous solution polymerization, preferably, by carrying out static polymerization.

BACKGROUND OF THE INVENTION

A water-absorbent resin is widely used in (a) sanitary articles such as disposable diapers, sanitary napkins, adult incontinence pads, (b) water-retaining agents for soils, (c) and the like. Such water-absorbent resins are produced and consumed in large quantities.

Conventionally, a method based on aqueous solution polymerization is known as a method for producing the water-absorbent resin. Known examples of such method are (i) a method in which a hydrogel obtained by polymerizing aqueous solution including a hydrophilic monomer is crushed while being stirred, (ii) a method in which a hydrogel obtained by carrying out static polymerization with respect to aqueous solution including a hydrophilic monomer is crushed, (iii) and the like. Among them, the latter method based on the static polymerization is advantageous in that, for example, a reaction device provided with a continuously conveyable endless belt enables continuous production with ease.

In the method based on the static polymerization, the hydrogel obtained by the polymerization is carried from the reaction device to a gel primary crusher or the like for example so that the hydrogel is crushed into pieces each of which has a predetermined size. However, the hydrogel is generally adhesive, so that the hydrogel is likely to adhere to the reaction device's surface which is in contact with monomer liquid (hereinafter, the surface is referred to also as "contact portion"). This results in various problems. For example, in case of carrying out the polymerization in the reaction device provided with a continuously conveyable endless belt, the hydrogel is likely to be entrapped, clogged, buckled, rolled in, or causes a similar problem, so that it is impossible to smoothly convey. Further, the hydrogel is extended which may result in cracks and severances. In this case, the cracked portion or the severed portion is likely to be rolled into a guide roll or a rotation roll etc., or the cracked portion or the severed portion is likely to be entrapped at a vicinity of an inlet of the gel primary crusher. Each of various problems brought about by adhesion of the hydrogel greatly decreases the productivity in producing the water-absorbent resin. Thus, improvement thereof is so desired.

As means for solving the problems brought about by the adhesion of the hydrogel, a technique for facilitating detachment of the hydrogel by spraying water between the contact portion and the hydrogel is proposed (see Japanese Unexamined Patent Publication No. 131218/2001 (Tokukai 2001-131218)). However, the hydrogel detached by spraying water has high water content, so that it is necessary to excessively dry the hydrogel thereafter. This causes lower productivity and disadvantage in terms of the production cost.

Further, as means for preventing the adhesion of the hydrogel, there is proposed means for carrying out electrolytic polishing with respect to the contact portion so that its surface roughness Rmax is not more than 3 μm and for always keeping a rear side of the contact portion cooled in stirring/polymerizing the monomer liquid (see Japanese Examined Patent Publication No. 15568/1994 (Tokukohei 6-15568)). However, in the static polymerization carried out by using the reaction device provided with a continuously conveyable endless belt, the polymerization is carried out in an unstirred state, so that the hydrogel is more likely to adhere to the contact portion. As a result, it is impossible to sufficiently prevent the adhesion even when the foregoing means is adopted. Moreover, in case where the foregoing means is adopted in the device provided with the endless belt, it is necessary to always keep the rear side of the contact portion cooled. This condition requires higher cost. In view of this, the foregoing means has disadvantage.

As another means for facilitating the detachment of the hydrogel, a material of the contact portion of the reaction device can be taken into consideration. For example, there is proposed a method in which a surfactant used as a general sheet detachment agent is applied to the contact portion of the reaction device (see Japanese Unexamined Patent Publication No. 155405/1986 (Tokukaisho 61-155405)). However, in this case, the surfactant adheres to the surface of the hydrogel, and the surfactant remains also on the water-absorbent resin obtained as a final product. The surfactant remaining on the water-absorbent resin decreases surface tension of liquid (urine or the like) absorbed in a sanitary product such as a disposable diaper for example. This results in such a problem that wet back of the absorbed liquid (urine or the like) increases.

As means which is free from the problem that the surface tension decreases, there is disclosed means for using fluororesin as the contact portion of the reaction device or for coating the contact portion with fluororesin (see Japanese Unexamined Patent Publication No. 155963/2004 (Tokukai 2004-155963), Japanese Examined Patent Publication No. 15481/1983 (Tokukosho 58-15481), and Unexamined Patent Publication No. 55002/1985 (Tokukaisho 60-55002)). However, when the inventors of the present invention carried out the means disclosed in each of Japanese Unexamined Patent Publication No. 155963/2004 (Tokukai 2004-155963), Japanese Examined Patent Publication No. 15481/1983 (Tokukosho 58-15481), and Unexamined Patent Publication No. 55002/1985 (Tokukaisho 60-55002) by using polytetrafluoroethylene (PTFE) which is a most general fluororesin, it was proved that the adhesion of the hydrogel was not sufficiently prevented. For example, in case of carrying out continuous production by using the reaction device provided with the continuously conveyable endless belt, the adhesion of the hydrogel hardly occurred in a short time. However, when the reaction device was operated for an extended period of time, the adhesion gradually occurred, which resulted in lower productivity. Moreover, in the water-absorbent resin obtained by using the PTFE as the fluororesin in the means disclosed in each of Japanese Unexamined Patent Publication No. 155963/2004 (Tokukai 2004-155963), Japanese Examined Patent Publication No. 15481/1983 (Tokukosho 58-15481), and Unexamined Patent Publication No. 55002/1985 (Tokukaisho 60-55002), a large amount of an extractable content is likely to be contained. When the water-absorbent resin containing a large amount of an extractable content is used in sanitary articles such as a disposable diaper for example, this causes a rough skin, so that it is desired to solve the problem brought about by the extractable content.

On the other hand, as the continuously conveyable reaction device based on the static polymerization, it is conventionally general to use an endless belt conveyer. In the reaction device provided with a continuously conveyable endless belt, it is preferable to use as the contact portion a flexible material such as a film or a sheet in view of a condition under which a strip-shaped belt having no end is moved in a loop shape. However, in this case, a driving tension at the time of conveyance is entirely exerted to the film or the sheet, so that the film or the sheet may be broken. Thus, it is difficult to carry out continuous production for an extended period of time. Moreover, also when a larger device is provided in consideration for the productivity (particularly, when the device is enlarged in a longitudinal direction), this raises a problem in terms of durability of the film or the sheet. Thus, it is desired to solve these problems in order to improve the productivity.

SUMMARY OF THE INVENTION

An object of the present invention is to provide not only a method for obtaining a water-absorbent resin while securing high productivity but also a method for producing a water-absorbent resin which has a smaller amount of an extractable content while favorably keeping easiness to detach the hydrogel and for allowing continuous production for an extended period of time.

In order to achieve the foregoing object, the inventors of the present invention diligently studied so as to solve the foregoing problems. As a result, they found a cause of the problem brought about in the means disclosed in each of Japanese Unexamined Patent Publication No. 155963/2004 (Tokukai 2004-155963), Japanese Examined Patent Publication No. 15481/1983 (Tokukosho 58-15481), and Unexamined Patent Publication No. 55002/1985 (Tokukaisho 60-55002), that is, they found why the adhesion of the hydrogel occurs and why a larger amount of the extractable content are contained. That is, they found the following fact: The PTFE used as a general fluororesin has extremely high melt viscosity such as $1\times10^{10}$ to $1\times10^{12}$ poise (at 340 to 380° C.), so that it is difficult to completely melt and fluidize the PTFE. In case where the PTFE is melted so as to mold or so as to be used in coating, the PTFE resultant, the film, or the sheet has many voids in its surface, so that oxygen adsorbed to the voids inhibits the polymerization and decreases a rate of the polymerization in the vicinity of the PTFE. As a result, the thus generated hydrogel is likely to adhere and is likely to have a large amount of an extractable content.

Specifically, in case of obtaining the PTFE resultant, the film, or the sheet by using the PTFE which is the contact portion of the reaction device, it is difficult to adopt a general melt molding method such as melt extrusion and injection molding, so that it is general to adopt (i) such a method that a block-shaped resultant is obtained in accordance with a baking process in which fine particles and powder are pressed and extruded so as to mold and then the resultant is baked (so-called free baking) and the thus obtained block is sliced into a film or a sheet or (ii) such a method that the coating is carried out on the basis of so-called impregnation sintering so as to mold a film. In any method, voids are likely to remain through the baking of the fine particle and powder or through the slicing of the block, so that it is impossible to mold a flat surface.

However, the fluororesin is superior to polyethylene and polypropylene in non-adhesiveness. Further, the fluororesin has flame retardancy and high heat resistance. Moreover, the fluororesin is a material having a low frictional property. Thus, it is considered that the fluororesin can be favorably used as a material for the contact portion of the reaction device. On the basis of these findings, the inventors of the present invention found the following fact: Although the PTFE which is a general fluororesin cannot avoid the foregoing problem, it is possible to prevent the adhesion of the hydrogel and the increase of the extractable content by using the reaction device including a fluororesin whose surface in contact with monomer liquid at a position where polymerization occur has the melt viscosity lower than a specific value.

Conventionally, it is general to use an endless belt conveyor as the continuously conveyable reaction device in the method based on the static polymerization as described above. In this case, all the driving tension at the time of conveyance is likely to be exerted to the film or the sheet, so that the material of the belt is required to have a certain strength. However, when the film or the sheet is made of resin having low melt viscosity so as to suppress the adhesion of the hydrogel and the increase of the extractable content as described above, the strength is likely to decrease. Particularly, in the fluororesin, an intermolecular force caused by fluorine is low, so that it is necessary to give a high molecular weight to the fluororesin in order to raise the strength. In view of this, conventionally, it is necessary to select a resin such as the PTFE having extremely high melt viscosity as the fluororesin constituting the contact portion of the reaction device, but this occurs such problem that operation carried out for an extended period of time causes the film or the sheet to be broken.

In consideration for these conditions, the inventors of the present invention conceived an arrangement in which a reaction device having an endless chain conveyor used to carry baggage in an airport for example is used instead of the conventional endless belt conveyor. That is, they reached the following conception: In the reaction device having the endless chain conveyor, the driving force at the time of conveyance is entirely exerted to the chain. Moreover, a chain guide is provided on the endless chain conveyor, so that there is less possibility that the film or the sheet snakes than the case of the endless belt conveyor, and the load exerted to the film or the sheet so as to prevent the snaking greatly decreases. Thus, even when the contact portion is constituted of a thin film or a thin sheet, the film or the sheet is hardly broken, so that it is possible to carry out the continuous production for an extended period of time. As a result, it is possible to enlarge the device in consideration for the productivity (particularly, it is possible to enlarge the device in a longitudinal direction). Further, they actually confirmed that it is possible to obtain the foregoing advantages in the reaction device having the endless chain conveyor.

That is, a first method according to the present invention for producing a water-absorbent resin includes the steps of: obtaining a hydrogel by supplying monomer liquid to a reaction device so that the monomer liquid is polymerized; and detaching the hydrogel from the reaction device, and the method includes the step of using, as the reaction device, a device whose surface in contact with the monomer liquid at a position where polymerization occurs is made of a fluororesin having a melt viscosity of less than $1\times10^8$ poise at 380° C.

A second method according to the present invention for producing a water-absorbent resin includes the steps of: obtaining a hydrogel by supplying monomer liquid to a reaction device so that the monomer liquid is polymerized; and detaching the hydrogel from the reaction device, and the method includes the step of using, as the reaction device, a device which has an endless chain conveyor and whose surface in contact with the monomer liquid at a position where polymerization occurs is provided with a film or a sheet made of a resin having a melt viscosity of less than $1\times10^8$ poise at 380° C.

According to the present invention, it is possible to obtain a water-absorbent resin having less amounts of an extractable content while securing high productivity by keeping favorable detachment property of the hydrogel.

Additional objects, features, and strengths of the present invention will be made clear by the description below. Further, the advantages of the present invention will be evident from the following explanation in reference to the drawings.

DESCRIPTION OF THE EMBODIMENTS

The following description will detail a method according to the present invention for producing a water-absorbent resin, but the scope of the present invention is not limited to the description. In addition to the following examples, the embodiment of the present invention can be suitably modified so as not to depart from the spirit of the present invention.

The water-absorbent resin of the present invention means a water swelling and water insoluble crosslinked polymer, and a crosslinked polymer forming hydrogel with the property of anionic, nonionic or cationic property, or two or more of them by water absorption. The water swelling property means to absorb a high amount of water such as not smaller than 2 times, preferably 10 to 3000 times, more preferably 50 to 5000 times, in ion exchanged water, based on its own solid content. "Water insoluble" means that an extractable content of un-crosslinked portion of the water-absorbent resin toward water is not higher than 50 wt %, preferably not higher than 25 wt %, more preferably not higher than 20 wt %, further preferably not higher than 15 wt % and particularly preferably not higher than 10 wt %. A measurement method for the extractable content is specified in Example.

A production method of the present invention includes a step of supplying monomer liquid to a reaction device and polymerizing the monomer liquid so as to obtain a hydrogel (hereinafter, the step is referred to also as "polymerization step") and a step of detaching the hydrogel from the reaction device (hereinafter, the step is referred to also as "detachment step"). Specifically, in the present invention, not only the monomer liquid (that is, aqueous solution containing a monomer) but also polymerization initiator are supplied to a contact portion of the reaction device so that the monomer liquid is polymerized, and the thus generated hydrogel is detached from the contact portion of the reaction device.

The reaction device used in the first method according to the present invention for producing a water-absorbent resin is a device made of a fluororesin whose surface in contact with the monomer liquid at a position where polymerization occurs (that is, the contact portion) has a melt viscosity of less than $1\times10^8$ poise, preferably $1\times10^2$ poise to $1\times10^5$ poise, at 380° C. Further, it is preferable that the surface in contact with the monomer liquid (contact portion) is a surface molded through melting the specific fluororesin. The surface made of the fluororesin whose melt viscosity is within the specific range, preferably the surface molded through melting (hereinafter, the surface is referred to also as "fluororesin layer") is relatively flat and has no void. Thus, it is possible to obtain the water-absorbent resin in which it is possible to greatly reduce the adhesion of the hydrogel generated by the polymerization and less amounts of an extractable content are contained.

Note that, specific examples of an arrangement in which the surface in contact with the monomer liquid is the fluororesin layer include: an arrangement in which the contact portion of the reaction device is made of the fluororesin (for example, the contact portion itself is a film or a sheet made of the fluororesin); an arrangement in which a surface of the contact portion of the reaction device is covered by a film or a sheet made of the fluororesin; and the like.

In the present invention, "molding through melting" (melt molding) means to mold the resin into a film, a sheet, or a desired shape which allows reaction of the monomer liquid, or to laminate the film or the sheet, or to melt the resin so as to carry out the coating in a film shape, in accordance with a melt molding method generally used such as melt extrusion or injection molding (for example, see Plastic Dictionary written by Yozo Hirano, published by Industrial Research Center of Japan (Second edition, Jan. 5, 1994), Page 721). Particularly, in the present invention, it is preferable to mold the resin into the film or the sheet in accordance with the melt extrusion.

In the present invention, the melt viscosity means a melt viscosity corresponding to a shearing speed of $1\times10^2$ sec$^{-1}$ in a curve indicative of how a melt viscosity varies depending on each shearing speed measured under such condition that: a test temperature is 380° C., a barrel diameter is 9.55 mm, a diameter (d) of a capillary is 1 mm and a length (l) of the capillary is 10 mm, and an inlet of the capillary is flat, in a flowing property test using a capillary rheometer which is in compliance with JIS-K-7199-1999.

Examples of the fluororesin used in the present invention include a tetrafluoroethylene/perfluoroalkylvinylether copolymer (PFA), tetrafluoroethylene/hexafluoropropylene copolymer (FEP), tetrafluoroethylene/ethylene copolymer (ETFE), polychlorotrifluoroethylene (PCTFE), chlorotrifluoroethylene/ethylene copolymer (ECTFE), polyvinylidenfluoride (PVDF), polyvinylfluoride (PVF), and the like. Among them, the fluororesin is not particularly limited as long as the melt viscosity at 380° C. is less than $1\times10^8$ poise (preferably, $1\times10^2$ poise to $1\times10^5$ poise). When the melt viscosity at 380° C. exceeds $1\times10^8$ poise, it tends to be hard to apply the melt molding method, so that it is difficult to mold a flat surface. As the fluororesin used in the present invention, PFA and FEP are preferable, and PFA is more preferable.

In the reaction device which can be used in the present invention, it is preferable that a roughness of the surface in contact with the monomer liquid in the polymerization portion (contact portion) is Rz 1.0 μm or lower. More preferably, the surface roughness is Rz 0.5 μm or lower. When the surface roughness exceeds Rz 1.0 μm, the adhesion of the hydrogel generated by the polymerization is likely to occur and a larger amount of an extractable content are likely to be contained. In the present invention, as described above, the contact portion includes the fluororesin layer, and the surface roughness of the fluororesin layer corresponds to the surface roughness of the surface which is in contact with the monomer liquid. In the first method according to the present invention for producing the water-absorbent resin, the contact portion is constituted of the fluororesin layer, so that it is not necessary to carry out the slicing process unless fine adjustment is required, and the surface roughness has a desired value which is in the aforementioned range (for example, approximately Rz 0.15 μm to 0.5 μm). In contrast, it is known that a fluororesin layer obtained by carrying out compression molding with respect to the conventionally used PTFE and slicing the resultant PTFE generally has a surface roughness of approximately Rz 5 μm. Note that, even in a layer obtained by melt-molding the specific fluororesin, there is a case where the surface roughness of the fluororesin layer exceeds Rz 1.0 μm depending on a condition or the like of the melt molding. In this case, the surface is subjected to heat treatment, so that the surface roughness can be easily adjusted to Rz 1.0 μm or lower. The heat treatment is not particularly limited. Examples of the heat treatment include: a method in which the layer is kept in contact with a surface of a heating element of 300 to 500° C. for a predetermined period; and the like.

However, the surface roughness in the present invention is Rz defined in JIS-B-0601-1994, and means a roughness obtained by averaging ten points. Specifically, the roughness is obtained as follows: a portion corresponding to 0.8 mm in a direction of an average line is picked up from a roughness curve, and an average of absolute values indicative of tops of the highest mountain to the fifth highest mountain (these values are measured in a direction of a vertical scale of the picked-up average line) is added to an average of absolute values indicative of bottoms of the lowest mountain to the fifth lowest mountain (these values are measured in the direction of the vertical scale of the picked-up average line), and the thus obtained value is represented by μm.

In case where the fluororesin layer is a fluororesin film or a fluororesin sheet molded by the melt molding, it is preferable that the thickness ranges from 100 μm to 5 mm. When the thickness of the film is less than 100 μm, the film may be partially torn in continuous operation with a single strip-shaped film provided on the reaction device. Thus, it is more preferable that the film is thicker in view of the strength. However, when the thickness of the film exceeds 5 mm, this is disadvantageous in view of the cost. Note that, it is general that a film whose thickness is less than 200 μm is referred to a "film" and a film whose thickness is 200 μm or more is referred to as "sheet". In the present specification, on the basis of this distinction, the term is switched between the "film" and the "sheet" depending on the thickness.

In the polymerization step, the monomer liquid, that is, the aqueous solution containing the monomer is supplied to the reaction device in combination with the polymerization initiator so that the aqueous solution polymerization is carried out. Here, in view of the productivity, it is preferable to adopt the static polymerization (that is, unstirred polymerization) as the aqueous solution polymerization.

The monomer is not particularly limited as long as the monomer can be made into the water-absorbent resin by polymerization. Examples of the monomer include: an anionic unsaturated monomer such as (meth)acrylic acid, maleic (anhydride), itaconic acid, cinnamic acid, vinyl sulfonic acid, allyltoluene sulfonic acid, vinyltoluene sulfonic acid, styrene sulfonic acid, 2-(meth)acrylamide-2-methylpropane sulfonic acid, 2-(meth)acryloylethane sulfonic acid, 2-(meth)acryloylepropane sulfonic acid, 2-hydroxyethyl (meth)acryloylphosphate, and salt thereof; a mercaptan-group-containing unsaturated monomer; a phenolic hydroxyl-group-containing unsaturated monomer; an amide-group-containing unsaturated monomer such as (meth)acrylamide, N-ethyl(meth)acrylamide, and N,N-dimethyl(meth)acrylamide; amino-group-containing unsaturated monomer such as N,N-dimethylaminoethyl(meth)acrylate, N,N-dimethylaminopropyl(meth)acrylate, and N,N-dimethylaminopropyl(meth)acrylamide; and the like. These monomers may be independently used or a suitable combination of two or more kinds may be used. However, it is preferable to use acrylic acid and/or a salt thereof (for example, salts of sodium, lithium, potassium, ammonium, amines, and the like, particularly, sodium salt is preferable in terms of the cost) as a main component in terms of performance of the obtained water-absorbent resin and in terms of the cost. With respect to an amount of all the monomer components, an amount of the acrylic acid and/or a salt thereof that are used therein preferably ranges from 70 to 100 mol %, and is more preferably 80 mol % or more, still more preferably 90 mol % or more, particularly preferably 95 mol % or more, and its upper limit is 100 mol %. Note that, in case where the monomer is an acid-group-containing monomer, a neutralization ratio thereof is not particularly limited. However, in using the final product for such purpose that the product can be in contact with the human body like sanitary materials, it is not necessary to carry out neutralization after the polymerization, so that the amount of the acrylic acid and/or a salt thereof is preferably 40 mol % or more and 90 mol % or less, more preferably 50 mol % or more and 80 mol % or less.

A concentration of the monomer at the time of polymerization (monomer concentration) is not particularly limited, but is preferably 40 wt % or more, more preferably 45 wt % or more. Generally, the lower concentration of the monomer liquid results in the lower productivity. Adversely, the higher concentration causes the adhesion of the hydrogel generated in the polymerization to rise, so that adhesion of the hydrogel is likely to occur. Thus, particularly in the polymerization carried out with the high concentration such as 45 wt % or more, the advantage of the present invention is apparent.

In the polymerization, a polymerization temperature (that is, a temperature of the monomer liquid supplied to the reaction device) is not particularly limited, it is preferable to carry out the polymerization at 50° C. or higher. Generally, when the polymerization temperature is excessively low, an induction period and a polymerization time extend, so that the productivity decreases. While, when the polymerization temperature is raised, the following condition occurs. In case of applying the high-temperature and high-concentration polymerization technique proposed in Japanese Unexamined Patent Publication No. 212204/2002 (Tokukai 2002-212204) for example, a temperature in the reaction system suddenly rises up to a boiling point of water after initiating the polymerization, so that the polymerization is promoted while giving off vapor. As a result, a solid concentration of the hydrogel generated in the polymerization rises, so that adhesion of the hydrogel is likely to occur. Thus, in the polymerization carried out with the high temperature such as 50° C. or higher, the advantage of the present invention is apparent.

The polymerization initiator is not particularly limited, and one kind is selected or two or more kinds are selected from polymerization initiators ordinarily used in the production of the water-absorbent resin on the basis of (i) a kind of the monomer to be polymerized, (ii) a polymerization condition, (iii) and the like. Examples of the polymerization initiator include: thermal decomposition initiators (for example, persulfate such as sodium persulfate, potassium persulfate, and ammonium persulfate; peroxide such as hydrogen peroxide, t-butylperoxide, and methylethylketoneperoxide; azo compound such as azonitryl compound, azoamidine compound, circular azoamidine compound, azoamide compound, alkylazo compound, 2,2'-azobis (2-amidinopropane)dihydrochloride, and 2,2'-azobis [2-(2-imidazoline-2-yl)propane]dihydrochloride); photodecomposition initiators (for example, benzoin derivative, benzyl derivative, acetophenone derivative, benzophenone derivative, and azo compound); and the like. Among them, it is preferable to use persulfate in terms of the cost and an ability for reducing the remaining monomer. Further, it may be so arranged that: also a reducer for promoting decomposition of each polymerization initiator is used so that a combination of the polymerization initiator and the reducer serves as a redox initiator. Examples of the above reducing agent include: (bi)sulfurous acid (salts) such as sodium sulfite and sodium hydrogensulfite; L-ascorbic acid (salts); reducible metals (salts) such as ferrous salts; and amines, but the reducer is not particularly limited. It is more preferable to use the photodecomposition initiator and the thermal decomposition initiator together. An amount of the polymerization initiator used is not particularly limited. However, with respect to the monomer contained in the monomer liquid, the amount ordinarily ranges from 0.001 wt % to 2 wt %, preferably from 0.01 to 0.5 wt %.

The polymerization initiator is generally mixed with the monomer in advance before being supplied to the reaction device. At this time, if it takes some time to mix and supply the polymerization initiator or a mixture liquid thereof partially stagnate in the tube, adhesion and growing of the polymerized resultant occur in the tube through which the mixture is supplied to the reaction device, so that the tube may be blocked up. Thus, it is preferable to quickly mix the monomer with the polymerization initiator and to quickly supply the mixture to the reaction device. For example, it is preferable to adopt a technique proposed in Japanese Unexamined Patent Publication No. 155963/2004 (Tokukai 2004-155963). Note that, the polymerization initiator is mixed with the monomer liquid under such condition that the polymerization initiator is in a solution state or a dispersion liquid state, but the monomer can be mixed without any modification as long as the polymerization initiator is in a liquid state.

In carrying out the polymerization, an internal cross-linking agent can be used as required. As the internal cross-linking agent, it is possible to use conventionally known internal cross-linking agents. Specific examples of the internal cross-linking agent include: N,N'-methylenebis(meth) acrylamide, (poly)ethyleneglycol di(meth)acrylate, (poly) propyleneglycol di(meth)acrylate, trimethylolpropanetri (meth)acrylate, glycerinetri(meth)acrylate, glycerineacrylatemethacrylate, ethyleneoxide denatured trimethylolpropanetri(meth)acrylate, pentaerythritolhexa (meth)acrylate, triallyl cyanurate, triallyl isocyanurate, triallyl phosphate, triallyl amine, poly(meth)allyloxyalkane, (poly)ethyleneglycol diglycidyl ether, glycerol diglycidyl ether, ethylene glycol, polyethylene glycol, propylene glycol, glycerine, 1,4-butanediole, pentaerythritol, ethylenediamine, ethylene carbonate, propylene carbonate, polyethyleneimine, glycidyl(meth)acrylate, and the like. Among them, one kind of the internal cross-linking agent or two or more kinds are used in consideration for the reactivity. Particularly, as the internal cross-linking agent, it is preferable to essentially use a compound having at least two polymerizable unsaturated groups. An amount of the internal cross-linking agent is suitably determined depending on properties of the desired water-absorbent resin. Generally, with respect to the monomer component, the amount of the internal cross-linking agent preferably ranges from 0.0001 to 10 mol %, more preferably from 0.001 to 1.0 mol %. When the amount of the internal cross-linking agent is excessively small, the gel strength decreases, so that the soluble component is likely to increase. Adversely, when the amount of the internal cross-linking agent is excessively large, the absorption capacity is likely to decrease.

Note that, in case of using the internal cross-linking agent, the internal cross-linking is mixed with the monomer liquid as in the polymerization initiator.

In carrying out the polymerization, it is possible to add, to the reaction system, hydrophilic polymers such as starch, starch derivative, cellulose, cellulose derivative, polyvinylalcohol, polyacrylic acid (salt), and cross-linked polyacrylic acid (salt); chain transfer agents such as hypophosphorous acid (salt); and a chelating agent. In case of adding these agents, an amount thereof ranges from 0 to 30 wt % with respect to the monomer component. Note that, in case of adding these agents to the reaction system, they are mixed with the monomer liquid as in the aforementioned polymerization initiator.

Generally, the polymerization is carried out under a normal pressure so as to make it easier to operate the device, but it is preferable also to reduce the pressure so as to decrease a boiling temperature of the polymerization system.

The solid concentration of the hydrogel generated in the polymerization (that is, the hydrogel at the time of the detachment step) is not particularly limited. However, the solid concentration is preferably 30 wt % or more, more preferably 50 wt % or more, still more preferably ranges from 55 to 80 wt %. Generally, when the solid concentration of the hydrogel is low, a load in a dry step is large, so that the productivity decreases. While, when the solid concentration of the hydrogel is high, the adhesion of the gel rises, so that adhesion of the gel is likely to occur. Thus, in case where the hydrogel generated in the polymerization has high solid concentration such as 30 wt % or more, more preferably 50 wt % or more, the advantage of the present invention is apparent.

In the production method of the present invention, it is preferable to continuously carry out the polymerization step and the detachment step in terms of the productivity. Thus, as the reaction device, it is preferable to use a device which can carry out continuous conveyance. A specific example of the reaction device is a continuous polymerization device, provided with an endless belt conveyor, an endless chain conveyor, or the like, which is used to produce an ordinary water-absorbent resin. Specifically, it is possible to use a device obtained by providing the fluororesin on the contact portion of the continuous polymerization device. As to the continuous polymerization device, it is possible to adopt a technique recited in each of Japanese Unexamined Patent Publication No. 34305/2000 (Tokukai 2000-34305), Japanese Unexamined Patent Publication No. 228604/1999 (Tokukaihei 11-228604), and Japanese Unexamined Patent Publication No. 156102/1987 (Tokukaisho 62-156102). In the continuous polymerization device, a portion where the polymerization is carried out generally has a concaved portion or the like for preventing outflow of the monomer liquid or has an edge for backing up the monomer liquid. Note that, examples of the continuous polymerization device favorably used in the production method of the present invention are devices described in Examples 1 and 2.

The second method of the present invention for producing a water-absorbent resin uses, as the reaction device, a device which has an endless chain conveyor and whose surface in contact with the monomer at a position where polymerization occurs is provided with a film or a sheet made of resin whose melt viscosity at 380° C. is less than $1 \times 10^8$ poise, preferably $1 \times 10^2$ poise to $1 \times 10^5$ poise. Further, it is preferable that the film or the sheet has a surface molded through melting a resin having the certain melt viscosity.

Specifically, in case of the endless belt conveyor, a driving tension at the time of conveyance is likely to be entirely exerted to the film or the sheet, so that it is necessary to make the film or the sheet thicker in terms of the strength. However, there is a limit in the film thickness and it is difficult to obtain the strength in the resin whose melt viscosity is within the foregoing range, so that it is difficult to enlarge the device (particularly, enlarge the device in a longitudinal direction) in consideration for the productivity and it may be difficult to carry out the continuous operation for an extended period of time in consideration for durability.

On the other hand, as to the endless chain conveyor, the driving tension at the time of conveyance is entirely exerted to the chain. Moreover, it is general that a chain guide is provided on the endless chain conveyor, so that there is less possibility that the film or the sheet snakes than the case of the endless belt conveyor, and the load exerted to the film or the sheet so as to prevent the snaking greatly decreases. Thus, even when the contact portion is constituted of a thin film or a thin sheet, the film or the sheet has excellent durability, so that it is possible to carry out the continuous production for an extended prior of time and this is advantageous in terms of the cost. Examples of a preferable endless chain conveyor include: a net chain conveyor provided with a net (gauze); a plate chain conveyor provided with a board (plate); and the like.

In the second method of the present invention for producing a water-absorbent resin, it is preferable that the resin essentially includes a fluororesin. As the fluororesin, it is possible to use a resin similar to the fluororesin used in the method of the present invention for producing the first water-absorbent resin. Further, the film or the sheet may include a resin other than the fluororesin as long as a melt viscosity of the resin is within the foregoing range.

A most preferable condition of the second method of the present invention for producing a water-absorbent resin is such that: a surface being in contact with the monomer liquid at a position where polymerization occurs has a film or a sheet, and the film or the sheet has a surface (the fluororesin layer) molded through melting the fluororesin having the specific melt viscosity.

In the device which can carry out the continuous conveyance, it is preferable to provide a belt cleaning unit between a position in which the hydrogel is detached from the contact portion and a position in which the contact portion returns to the monomer liquid supplying nozzle. Further, in case where the belt cleaning unit is provided, it is preferable that a cleaning time (in other words, an entire time taken for a certain point of the strip-shaped contact portion to pass through the belt cleaning unit) is 10 minutes or less. In case where the cleaning time is long, a large amount of cleaning water is required in the cleaning, so that it takes some cost to dispose of drainage. Adversely, in case where the cleaning time is short, it is impossible to obtain sufficient cleaning effect. In other words, in case of such a short cleaning time (not more than 10 minutes) that it is impossible to sufficiently remove adhering substances from the contact portion, the advantage of the present invention is apparent.

In the device which can carry out the continuous conveyance, an oxygen concentration in the reaction device is not particularly limited, but is preferably 2.0% by volume or more, more preferably ranges from 5.0% by volume to an atmospheric concentration. Specifically, a position indicated by "in the reaction device" means also a position surrounding the contact portion in which the polymerization reaction occurs, and it is preferable that an oxygen concentration of an atmosphere around the contact portion is within the foregoing range.

Generally, it is known that the presence of oxygen at the time of polymerization inhibits the polymerization. For example, also in a high-temperature short-time polymerization of Japanese Unexamined Patent Publication No. 212204/2002 (Tokukai 2002-212204), oxide is adsorbed to a surface of the contact portion of the conventional device. Thus, unless air in the device is replaced by nitrogen so as to keep a low oxygen concentration (less than 2.0% by volume), it is impossible to avoid delay of the polymerization and decrease in a polymerization ratio of a gel on the surface of the contact portion. On the other hand, in the present invention, the polymerization does not delay and the polymerization ratio of the gel on the surface of the contact portion does not decrease even in the presence of oxygen whose concentration is 2.0 percent by volume or more. Thus, in the oxygen concentration within the foregoing range, the advantage of the present invention is apparent.

In case of continuously carrying out the polymerization step and the detachment step, the monomer liquid (actually, a mixture solution of the monomer liquid, the polymerization initiator, and the like) is carried from an adjustment device directly to a supplying pipe or is carried to the supplying pipe after being temporarily stored in a storage tank so as to be continuously supplied. An amount of the monomer liquid is adjusted so as to satisfy a desired production amount. At this time, a diameter of the pipe through which the monomer liquid is supplied and a rate at which the monomer flows are suitably adjusted depending on a kind of the fluid and a purpose for which the fluid is used, and the diameter of the pipe is adjusted in terms of the cost. Specifically, see known references (for example, "Piping Engineering" written by Yoshio Osanai (Kogakutosyo Ltd.)).

In the production method of the present invention, the detached hydrogel can be used without any modification and also comminuted hydrogel can be used. Generally, the hydrogel is further dried and crushed into particulate water-absorbent resin, and the water-absorbent resin particles are subjected to surface cross-linking treatment or are subjected to granulation so as to be used as a water-absorbent resin product. In crushing, drying, and carrying out the surface cross-linking treatment with respect to the hydrogel, it is possible to adopt known techniques (for example, techniques recited in Japanese Unexamined Patent Publication No. 212204/2002 (Tokukai 2002-212204)).

It is preferable that the water-absorbent resin obtained in the production method of the present invention has a GEX value of 21 or more. The GEX value is calculated by the following equation under such condition that the water-absorbent resin's absorption capacity without load (Gel Volume: hereinafter, referred to as GV) is y (g/g) and an amount of its extractable content is x (%). In terms of a relation between the water absorption capacity without load (GV) and the amount of the extractable content, the water-absorbent resin exhibits more excellent effect as the amount of the extractable content is less in proportion to the absorption capacity without load (GV). In case where the amount of the extractable content is more in proportion to the absorption capacity without load (GV), the water-absorbent resin is inferior in terms of the performance. The GEX value is a parameter for evaluating the foregoing state. Thus, it can be said that the water-absorbent resin has higher performance as the GEX value is larger. According to the aforementioned production method of the present invention, it is possible to easily obtain the water-absorbent resin whose GEX value is within the foregoing range.

$$GEX\ \text{value} = (y+17)/\ln(x)$$

where $\ln(x)$=natural logarithm of x

The following Examples will further detail the present invention, but the present invention is not limited to them. Hereinafter, unless particularly mentioned, "parts by weight" is referred to merely as "parts" and "wt %" is referred to merely as "%".

Properties of water-absorbent resins respectively obtained in Examples and Comparative Example were measured as follows. Note that, each measurement was carried out within a range of 23±2° C.

<Absorption Capacity without Load (GV)>

0.2 g of a water-absorbent resin was exactly measured (the amount corresponds to "weight of water-absorbent resin" in the following equation) and was evenly contained in a bag (60 mm×60 mm) made of a nonwoven fabric. Then, the bag was soaked in 0.9% sodium chloride aqueous solution (physiological saline), and was withdrawn 30 minutes later. By using a centrifugal separator, the bag was drained for three minutes at 250×9.81 m/s$^2$ (250 G), and a weight W1 (g) of the bag was measured. Further, the same operation was performed without using the water-absorbent resin, and a weight W0 (g) was measured. Then, from the weights W1 and W0, the absorption capacity without load (g/g) was calculated according to the following equation.

$GV$ (g/g)=[($W1-W0$)/weight of water-absorbent resin]−1

<Amount of an Extractable Content>

184.3 g of a 0.9% sodium chloride aqueous solution (physiological saline) was measured and poured into a 250 ml plastic container having a cover. Into the solution, 1.00 g of a water-absorbent resin was added, and the solution was stirred for 16 hours, thereby extracting an extractable content from the water-absorbent resin. The extract solution was filtered through a piece of filter paper, thereby obtaining a filtrate. 50.0 g of the filtrate was measured so as to be used as a measurement solution.

First, only the physiological saline was titrated by using a 0.1N NaOH solution, until pH of the physiological saline reached 10. Thereafter, the physiological saline was titrated by using a 0.1N HCl solution, until pH of the physiological saline reached 2.7. In this way, blank titration amounts ([bNaOH]ml and [bHCl]ml) were measured. The same operation was performed with respect to the measurement solution, thereby measuring titration amounts ([NaOH]ml and [HCl]ml). Thereafter, for example, in case of a water-absorbent resin including a known amount of acrylic acid and its sodium salt, an amount of an extractable content in the water-absorbent resin was calculated, in accordance with the following equation, from an average molecular mass of the monomer and the titration amounts obtained by the foregoing operation.

Amount of extractable content (%)=0.1×Mw×184.3× 100×([HCl]−[bHCl])/1000/1.0/50.0 where Mw=72.06×(1−neutralization ratio/100)+ 94.04×neutralization ratio/100

Neutralization ratio (mol %)=(1−([NaOH]−[bNaOH])/ ([HCl]−[bHCl]))×100

<GEX Value>

The GEX value was calculated by the following equation under such condition that the absorption capacity without load (GV) was y (g/g) and an amount of its extractable content was x (%). It can be said that the water-absorbent resin has higher performance as the GEX value is larger.

$GEX$ value=$(y+17)/\ln(x)$ where ln(x)=natural logarithm of x

EXAMPLE 1

Figure 1:
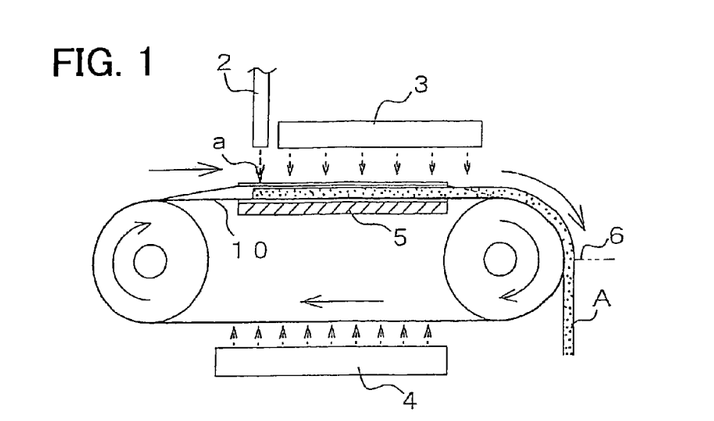
FIG. 1 is a schematic illustrating a continuous polymerization device (1) used in Example 1 as one embodiment of a reaction device which can be used in the present invention.
Figure 2:
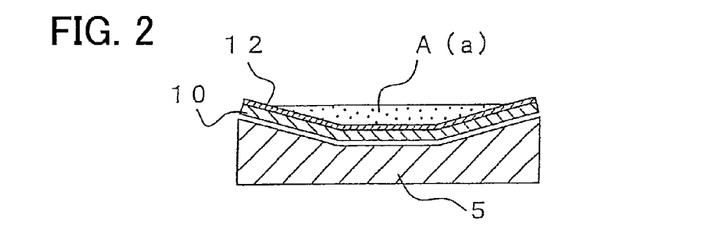
FIG. 2 is a cross sectional view of a moving belt of the continuous polymerization device (1).

A water-absorbent resin was produced by using a continuous polymerization device (1) provided with an endless belt conveyor illustrated in each of FIG. 1 and FIG. 2.

In the device (1), an endless strip-shaped belt 10 was driven by rollers disposed on both ends so as to move in a loop shape. Thus, in a moving loop, an upper portion and a lower portion of the belt 10 horizontally moved in directions opposite to each other.

The belt 10 was entirely made of glass fiber base material, and a fluororesin layer 12 was laminated on a surface of the belt 10. The fluororesin layer 12 was a film molded by carrying out melt extrusion with respect to tetrafluoroethylene/perfluoroalkylvinylether copolymer (PFA) whose melt viscosity was 5×10$^3$ poise at 380° C. so as to have thickness of 100 μm. The surface roughness of the film 12, that is, the surface roughness being in contact with monomer liquid a was Rz 0.35 μm.

Above the moving loop of the belt 10, a monomer supplying nozzle 2 was provided. The monomer supplying nozzle 2 continuously supplied the monomer liquid a to the surface of the belt 10 horizontally moving from left to right in FIG. 1. In the horizontal moving path of the belt 10, a UV lamp 3 for emitting light required in the polymerization reaction to the supplied monomer liquid a was disposed on the downstream side of the monomer supplying nozzle 2. Although not illustrated, a heating unit for heating the belt 10 was provided so that temperature of the belt 10 passing by the UV lamp 3 was kept at approximately 100° C. after passing by the monomer supplying nozzle 2.

Between the monomer supplying nozzle 2 and the vicinity of a position in which the UV lamp 3 was disposed, a trough 5 for coming into contact with an undersurface of the belt 10 so as to guide the belt 10 was fixedly provided. As illustrated in FIG. 2, in a cross-sectional shape of the trough 5, its upper side shape had a flat center portion and slanting portions positioned on both sides of the center portion with them rising up slantwise. When the flexible belt 10 moved along the trough 5, its both sides slanted upwardly on the basis of the upper shape of the trough 5, and its center portion was concaved. Note that, after passing by the trough 5, the belt 10 returned into the flat shape and moved.

The monomer liquid a was continuously supplied from the monomer supplying nozzle 2 to the belt 10. The monomer liquid a was gathered in a groove portion which was a central concavity of the belt 10. Thus, the monomer liquid a neither leaked nor overflowed to the outside of the belt 10. The monomer liquid a gathered in the concavity of the belt 10 was polymerized by light emission of the UV lamp 3, so that the monomer liquid a became into a strip-shaped hydrogel A.

After passing by the UV lamp 3, the belt 10 changed its moving direction from the horizontal direction to downward direction while moving in a curvature shape, and then the belt 10 horizontally moved in an opposite direction. The strip-shaped hydrogel A moving with the belt 10 was detached from the belt by a detachment section 6 positioned in an end of the moving path, and the separated hydrogel A extended in a downward direction. The hydrogel A had been in contact with the fluororesin layer 12 of the belt 10, so that the hydrogel A was easily separated from the belt 10.

Note that, when the belt 10 horizontally moved in the opposite direction after turning in the downward direction, the belt 10 moved so that a surface of the belt 10, that is, the fluororesin layer 12 faced downwardly. There is provided cleaning means 4 for cleaning the belt 10 by spraying cleaning fluid onto the surface of the belt 10.

Sections of the continuous polymerization device (1) respectively had the following sizes: an active length (a distance from a position in which the monomer liquid on the belt 10 was supplied (that is, a position below the monomer supplying nozzle 2) to the detachment section 6) was 3.8 m, and a breadth of the belt 10 was 60 cm, and a bottom width of the trough 5 was 20 cm, and an angle at which the trough 5 slanted was 10°.

Specifically, a flow volume of 48.5% sodium hydrate aqueous solution was 5.0 g/second, a flow volume of acrylic acid was 6.2 g/second, a flow volume of 30 wt % polyethyleneglycoldiacrylate (average molecular weight was 487) aqueous solution (I) was 0.056 g/second, a flow volume of a solution (II) obtained by dissolving 1.0 part of 2-hydroxymethyl-2-methylpropiophenone and 1.1 parts of 45% diethylenetriamine penta sodium penta acetic acid aqueous solution in 97.9 parts of 20% acrylic acid aqueous solution was 0.075 g/second, and a flow volume of water was 5.0 g/second. Under these conditions, these materials were continuously supplied to a mixer so as to be mixed with each other, thereby preparing monomer liquid. The temperature of the monomer liquid was 98° C.

Subsequently, while adding 2% sodium persulfate aqueous solution to the monomer liquid in a pipe connecting the mixer with the monomer supplying nozzle at a flow volume of 0.34 g/second, the mixture was continuously supplied to the belt moving at a rate of 1 m/minute so that the polymerization was carried out on the belt, thereby generating the strip-shaped hydrogel. The thus generated strip-shaped hydrogel was continuously detached from the belt. This continuous production was carried out for 50 hours. Then, it was proved that no hydrogel adhered to the belt after 50-hour operation. The hydrogel obtained in this period was free from any damage or any crack (cleavage) and was always smoothly detached so as to be put in a screw type extruder.

Note that, the hydrogel detached from the continuous polymerization device was partially cut and the cut portion was immediately cooled down, and then the cooled portion was quickly fragmented with scissors, and 5 g of the fragmented hydrogel was measured and placed in a petri dish and was dried in a dryer at 180° C. for 24 hours. Thereafter, a solid concentration of the hydrogel was calculated. It was 55 wt %.

The strip-shaped hydrogel having been detached was put in the screw type extruder having spiral protruding portions therein, and the hydrogel was extruded through a perforated plate (hole diameter was 9.5 mm) of the screw type extruder so as to be particulate. The particulate hydrogel was dried with hot air at 180° C. for 30 minutes, and then the dried gel was pulverized by a roll mill (mill type pulverizer). Thereafter, the pulverized particles were classified by a sieve into a range of 300 to 600 μm, thereby obtaining water-absorbent resin particles (1). Properties of the water-absorbent resin particles were measured. As a result of the measurement, an absorption capacity without load (GV) was 45 g/g, an amount of an extractable content was 16%, and a GEX value was 22.4.

EXAMPLE 2

Figure 3:
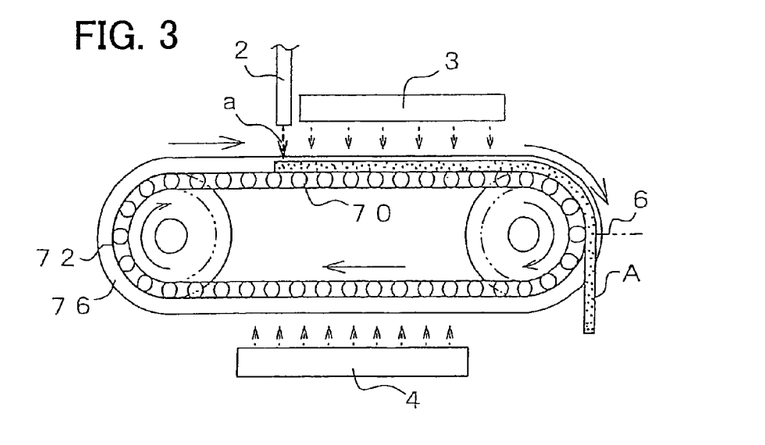
FIG. 3 is a schematic illustrating a continuous polymerization device (2) used in Example 2 as another embodiment of the reaction device which can be used in the present invention.
Figure 4:
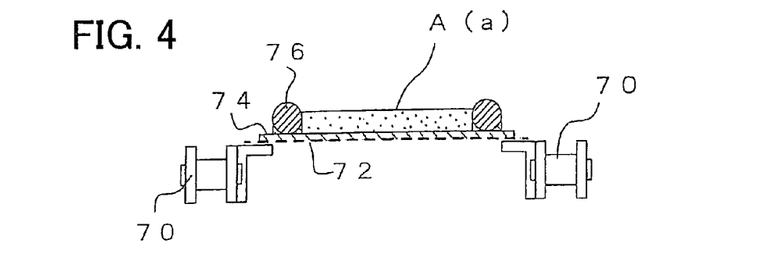
FIG. 4 is a cross sectional view of a moving belt of the continuous polymerization device (2).

A continuous polymerization device (2) provided with an endless chain conveyor illustrated in each of FIG. 3 and FIG. 4 was used to produce a water-absorbent resin. An arrangement thereof was basically the same as the continuous polymerization device of Example 1, so that differences therebetween will be mainly explained.

As detailed in FIG. 4, a pair of chains 70 respectively positioned left and right were connected with each other by a stainless gauze 72 (Φ1 mm, 8 mesh). On the gauze 72, a fluororesin sheet (PFA sheet) 74 is placed and fixed. The fluororesin sheet 74 was molded by carrying out melt extrusion with respect to a tetrafluoroethylene/perfluoroalkylvinylether copolymer (PFA) whose melt viscosity at 380° C. was $5 \times 10^3$ poise, and its width was 70 cm and its thickness was 250 μm. The surface roughness of the PFA sheet, that is, the roughness of the surface being in contact with the monomer liquid a was Rz 0.25 μm.

Further, on the fluororesin sheet 74, a pair of edge ropes 76 was provided from side to side with a certain interval therebetween. Each of the edge ropes 76 was made of silicon whose height was 3 cm, and is disposed 5 cm inward from each side of the sheet 74 in a width direction.

A belt-shaped loop constituted of the chain 70, the gauze 72, the fluororesin sheet 74, and the edge ropes 76 was hanged on chain sprockets positioned on both sides so that the loop moved.

The monomer supplying nozzle 2, the UV lamp 3, the cleaning unit 4, and the heating unit were arranged in the same manner as in Example 1.

As in Example 1, the monomer liquid a was continuously supplied from the monomer supplying nozzle 2 to the fluororesin sheet 74. The supplied monomer liquid a was retained by the edge ropes 76 so that the monomer liquid a was stored in a layer with certain thickness. With the movement of the chain 70, the monomer liquid a moves while polymerized, so that the hydrogel A was generated. As in Example 1, the hydrogel A was separated from the fluororesin sheet 74 by the detachment section 6 at an end of the horizontal moving path.

Sections of the continuous polymerization device (2) respectively had the following sizes: an active length (a distance from a position in which the monomer liquid on the sheet 74 was supplied (that is, a position below the monomer supplying nozzle 2) to the detachment section 6) was 6 m, and a breadth of the fluororesin sheet 74 was 70 cm.

Specifically, a flow volume of 48.5% sodium hydrate aqueous solution was 19 g/second, a flow volume of acrylic acid was 23.5 g/second, a flow volume of 30 wt % polyethyleneglycoldiacrylate (average molecular weight was 487) aqueous solution (I) was 0.097 g/second, a flow volume of a solution (II) obtained by dissolving 1.0 part of 2-hydroxymethyl-2-methylpropiophenone and 1.1 parts of 45% diethylenetriamine penta sodium penta acetic acid aqueous solution in 97.9 parts of 20% acrylic acid aqueous solution was 0.29 g/second, and a flow volume of water was 12 g/second. Under these conditions, these materials were continuously supplied to a mixer so as to be mixed with each other, thereby preparing monomer liquid. The temperature of the monomer liquid was 98° C.

Subsequently, while adding 2% sodium persulfate aqueous solution to the monomer liquid in a pipe connecting the mixer with the monomer supplying nozzle at a flow volume of 0.45 g/second, the mixture was continuously supplied to the sheet moving at a rate of 1.5 m/minute so that the polymerization was carried out on the sheet, thereby generating the strip-shaped hydrogel. The thus generated strip-shaped hydrogel was continuously detached from the sheet. This continuous production was carried out for 50 hours. Then, it was proved that no hydrogel adhered to the sheet after 50-hour operation. The hydrogel obtained in this period was free from any damage or any crack (cleavage) and was always smoothly detached so as to be put in a screw type extruder described later. Further, the PFA sheet was not broken after 50-hour operation.

Note that, a solid concentration of the hydrogel detached from the continuous polymerization device was calculated in the same manner as in Example 1. As a result of the calculation, the solid concentration was 65 wt %.

The strip-shaped hydrogel having been detached was put in the screw type extruder having spiral protruding portions therein, and the hydrogel was extruded through a perforated plate (hole diameter was 13 mm) of the screw type extruder so as to be particulate. The particulate hydrogel was dried with hot air at 180° C. for 30 minutes, and then the dried gel was pulverized by a roll mill (mill type pulverizer). Thereafter, the pulverized particles were classified by a sieve into a range of 300 to 600 μm, thereby obtaining water-absorbent resin particles (2). Properties of the water-absorbent resin particles were measured. As a result of the measurement, an absorption capacity without load (GV) was 36 g/g, an amount of an extractable content was 10%, and a GEX value was 23.0.

EXAMPLE 3

A water-absorbent resin was produced in the same manner as in Example 2 by using a continuous polymerization device (2') similar to the continuous polymerization device (2) except that: the sheet 74 (PFA sheet) of the continuous polymerization device (2) used in Example 2 was replaced by a sheet (FEP sheet) molded by carrying out melt extrusion with respect to tetrafluoroethylene/hexafluoropropylene copolymer (FEP) whose melt viscosity was $8\times10^3$ poise at 380° C. so as to have width of 70 cm and thickness of 500 μm (the surface roughness of the FEP sheet, that is, the surface roughness being in contact with monomer liquid a was Rz 0.30 μm).

Specifically, a strip-shaped hydrogel was generated in the same manner as in Example 2, and the thus generated strip-shaped hydrogel was continuously detached from the sheet. This continuous production was carried out for 50 hours. Then, it was proved that no hydrogel adhered to the sheet after 50-hour operation. The hydrogel obtained in this period was free from any damage or any crack (cleavage) and was always smoothly detached so as to be put in a screw type extruder described later. Further, the FEP sheet was not torn 50 hours later.

Note that, a solid concentration of the hydrogel detached from the continuous polymerization device was calculated in the same manner as in Example 1. As a result of the calculation, the solid concentration was 64 wt %.

The same operation as in Example 2 was carried out by using the detached hydrogel, thereby obtaining water-absorbent resin particles (3). Properties of the water-absorbent resin particles were measured. As a result of the measurement, an absorption capacity without load (GV) was 37 g/g, an amount of an extractable content was 11%, and a GEX value was 22.5.

COMPARATIVE EXAMPLE 1

A water-absorbent resin was produced in the same manner as in Example 1 by using a continuous polymerization device (1') similar to the continuous polymerization device (1) except that: the belt 10 of the continuous polymerization device (1) used in Example 1 was replaced by a belt molded by providing, on a surface of a rubber base material, a sheet made in such a manner that: polytetrafluoroethylene (PTFE) whose melt viscosity was $1\times10^9$ poise or more at 380° C. is molded through sintering processing and the thus obtained block is sliced so as to have thickness of 400 μm (the surface roughness of the PTFE sheet, that is, the surface roughness being in contact with monomer liquid a was Rz 5.0 μm).

Specifically, a strip-shaped hydrogel was generated in the same manner as in Example 1, and the thus generated strip-shaped hydrogel was continuously detached from the belt. This continuous production was carried out. Right after starting the continuous production, no hydrogel adhered to the contact portion. However, one hour later, thready adhesion was found between the contact portion and the hydrogel at the time of detachment. Then, more and more hydrogel gradually adhered to the contact portion. 10 hours later, a part of the adhering hydrogel was not removed by the cleaning, so that the hydrogel returned to a position below the monomer supplying nozzle 2. 15 hours later, the hydrogel so firmly adhered to the contact portion that it was necessary to stop the production.

Note that, a solid concentration of the hydrogel detached from the continuous polymerization device was calculated in the same manner as in Example 1. As a result of the calculation, the solid concentration was 54 wt %.

The same operation as in Example 1 was carried out by using the detached hydrogel, thereby obtaining water-absorbent resin particles (C1). Properties of the water-absorbent resin particles were measured. As a result of the measurement, an absorption capacity without load (GV) was 44 g/g, an amount of an extractable content was 19%, and a GEX value was 20.7.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A production method of a water-absorbent resin, including the steps of: obtaining a hydrogel by supplying monomer liquid to a reaction device so that the monomer liquid is polymerized; and detaching the hydrogel from the reaction device, said method comprising the step of using, as the reaction device, a device whose surface in contact with the monomer liquid at a position where polymerization occurs is made of a fluororesin having a melt viscosity of $1\times10^2$ poise to $1\times10^5$ poise at 380° C., wherein said fluororesin is selected from the group consisting of a tetrafluoroethylene / perfluoroalkylvinylether copolymer (PFA), tetrafluoroethylene/hexafluoropropylene copolymer (FEP), tetrafluoroethylene ethylene copolymer (ETFE), polychlorotrifluoroethylene (PCTFE), chlorotrifluoroethylendethylene copolymer (ECTFE), polyvinylidenfluoride (PVDF), and polyvinylfluoride (PVF), wherein a roughness of the surface in contact with the monomer liquid is Rz 1.0 μm[□m] or less, and wherein an oxygen content in the reaction device at the time of polymerization of the monomer liquid, ranges from 5.0% by volume to an atmospheric concentration.

2. The method as set forth in claim 1, wherein the reaction device is a device which is capable of continuous conveyance.

3. The method as set forth in claim 1, wherein the fluororesin is a tetrafluoroethylene/perfluoroalkylvinylether copolymer and/or a tetrafluoroethylene/hexafluoropropylene copolymer.

4. The method as set forth in claim 1, wherein a concentration of the monomer liquid is 40 wt % or more.

5. The method as set forth in claim 1, wherein the polymerization is carried out at 50° C. or higher.

6. The method as set forth in claim 1, wherein a GEX value of the water-absorbent resin is 21 or more.

7. A water-absorbent resin, being produced by the production method as set forth in claim 1.

8. A particulate water-absorbent resin, being obtained through classification of particles obtained by drying and pulverizing the hydrogel produced by the method as set forth in claim 1.

9. A water-absorbent resin article, obtained by carrying out surface cross-linking treatment and/or granulation with respect to the particulate water-absorbent resin as set forth in claim 8.

10. The method of claim 1, wherein the oxygen content in the reaction device refers to the oxygen content in the atmosphere around the surface in contact with the monomer liquid.

11. A production method of a water-absorbent resin, including the steps of: obtaining a hydrogel by supplying monomer liquid to a reaction device so that the monomer liquid is polymerized; and detaching the hydrogel from the reaction device, said method comprising the step of using, as the reaction device, a device which has an endless chain conveyor and whose surface in contact with the monomer liquid at a position where polymerization occurs is provided with a film or a sheet made of a resin having a melt viscosity of $1 \times 10^2$ poise to $1 \times 10^5$ poise at 380° C., wherein a roughness of the surface in contact with the monomer liquid is Rz 1.0 μm[□m] or less, and wherein an oxygen content in the reaction device at the time of polymerization of the monomer liquid, ranges from 5.0% by volume to an atmospheric concentration.

12. The method as set forth in claim 11, wherein the resin is essentially a fluororesin.

13. The method as set forth in claim 11, wherein the fluororesin is a tetrafluoroethylene/perfluoroalkylvinylether copolymer and/or a tetrafluoroethylene/hexafluoropropylene copolymer.

14. The method as set forth in claim 11, wherein a concentration of the monomer liquid is 40 wt % or more.

15. The method as set forth in claim 11, wherein the polymerization is carried out at 50° C. or higher.

16. The method as set forth in claim 11, wherein a GEX value of the water-absorbent resin is 21 or more.

17. A water-absorbent resin, being produced by the production method as set forth in claim 11.

18. A particulate water-absorbent resin, being obtained through classification of particles obtained by drying and pulverizing the hydrogel produced by the method as set forth in claim 11.

19. A water-absorbent resin article, obtained by carrying out surface cross-linking treatment and/or granulation with respect to the particulate water-absorbent resin as set forth in claim 18.

20. The method of claim 11, wherein the oxygen content in the reaction device refers to the oxygen content in the atmosphere around the surface in contact with the monomer liquid.

* * * * *